United States Patent
Beers et al.

(10) Patent No.: US 8,496,432 B2
(45) Date of Patent: Jul. 30, 2013

(54) THRUST BEARING COOLING PATH

(75) Inventors: Craig M. Beers, Wethersfield, CT (US); Brent J. Merritt, Southwick, MA (US); Victoria S. Richardson, Hartford, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 621 days.

(21) Appl. No.: 12/728,313

(22) Filed: Mar. 22, 2010

(65) Prior Publication Data
US 2011/0229313 A1 Sep. 22, 2011

(51) Int. Cl.
*F04D 29/58* (2006.01)

(52) U.S. Cl.
USPC ............ 415/180; 415/229; 415/104; 384/105

(58) Field of Classification Search
USPC .................. 384/103, 105, 106; 415/180, 110, 415/111, 229
See application file for complete search history.

(56) References Cited

U.S. PATENT DOCUMENTS

| | | | |
|---|---|---|---|
| 4,270,064 A | 5/1981 | Glandorf et al. | |
| 4,323,286 A | 4/1982 | Vohr | |
| 4,699,524 A | 10/1987 | Bath | |
| 5,113,670 A * | 5/1992 | McAuliffe et al. | 62/402 |
| 6,729,858 B2 | 5/2004 | Choi et al. | |
| 6,752,533 B2 | 6/2004 | Saville et al. | |
| 6,765,326 B1 | 7/2004 | Nakazono et al. | |
| 7,342,332 B2 | 3/2008 | McAuliffe et al. | |
| 7,394,175 B2 | 7/2008 | McAuliffe | |
| 7,431,512 B2 | 10/2008 | Young | |
| 7,648,280 B2 | 1/2010 | Struziak et al. | |

\* cited by examiner

*Primary Examiner* — Nathaniel Wiehe
*Assistant Examiner* — Justin Seabe
(74) *Attorney, Agent, or Firm* — Carlson, Gaskey & Olds, PC

(57) ABSTRACT

A compressor rotor compresses and delivers compressed air across a turbine rotor. The turbine rotor is connected to the compressor rotor such that rotation of the turbine rotor drives the compressor rotor. A shaft is connected to rotate with the turbine rotor and the compressor rotor. A thrust bearing is provided by a member extending perpendicular and radially outwardly of the shaft. The member rotates with the shaft and faces a first housing wall. A hollow chamber is formed on an opposed side of the first housing wall. A cooling air path supplies air across a thrust bearing surface, and between the member and the first housing wall. The first housing wall has a communication hole for communicating cooling air from the cooling air path into the hollow cavity to drive air within the hollow chamber. Also, a housing incorporating the communication hole is disclosed.

6 Claims, 3 Drawing Sheets

THRUST BEARING COOLING PATH

BACKGROUND

This application relates to an air machine with an air-driven turbine drives an air compressor, wherein a thrust bearing surface is provided with a cooling air path, and a portion of the cooling air is tapped to drive air within a hollow cavity.

Air machines are known and include a turbine driving a compressor. Partially compressed air is delivered to the compressor, and the compressor is driven to further compress this air. This compressed air is passed downstream to drive a turbine, with the turbine in turn driving the compressor as the air expands across the turbine. This expanded air is then utilized for a downstream use, such as cabin air for an aircraft.

The known air machines have a shaft which connects the compressor and the turbine.

A thrust bearing surface is provided by a member which is fixed to rotate with the shaft of the air machine. The thrust bearing surface faces a housing surface, which has a hollow chamber on an opposed side of a housing wall. The air sitting within the hollow chamber becomes stagnant, and adds heat to the housing and thrust bearing interface.

SUMMARY

An air supply machine has a compressor rotor for compressing and delivering compressed air to a downstream inlet. Air from the downstream inlet passes across a turbine rotor to drive it to rotate. The turbine rotor is connected to the compressor rotor such that rotation of the turbine rotor drives the compressor rotor to rotate and compress the air. A shaft is connected to rotate with the turbine rotor and the compressor rotor. A thrust bearing is provided by a member extending perpendicular and radially outwardly of the shaft. The member rotates with the shaft and faces a first housing wall. A hollow chamber is formed on an opposed side of the first housing wall. A cooling air path supplies air across a thrust bearing surface, and between the member and the first housing wall. The first housing wall also has a communication hole for communicating cooling air from cooling air path into the hollow chamber to drive air within the hollow chamber.

In addition, a housing incorporating at least one communication hole and for use in an air supply machine is disclosed and claimed.

These and other features of the present invention can be best understood from the following specification and drawings, the following of which is a brief description.

DETAILED DESCRIPTION

Figure 1:
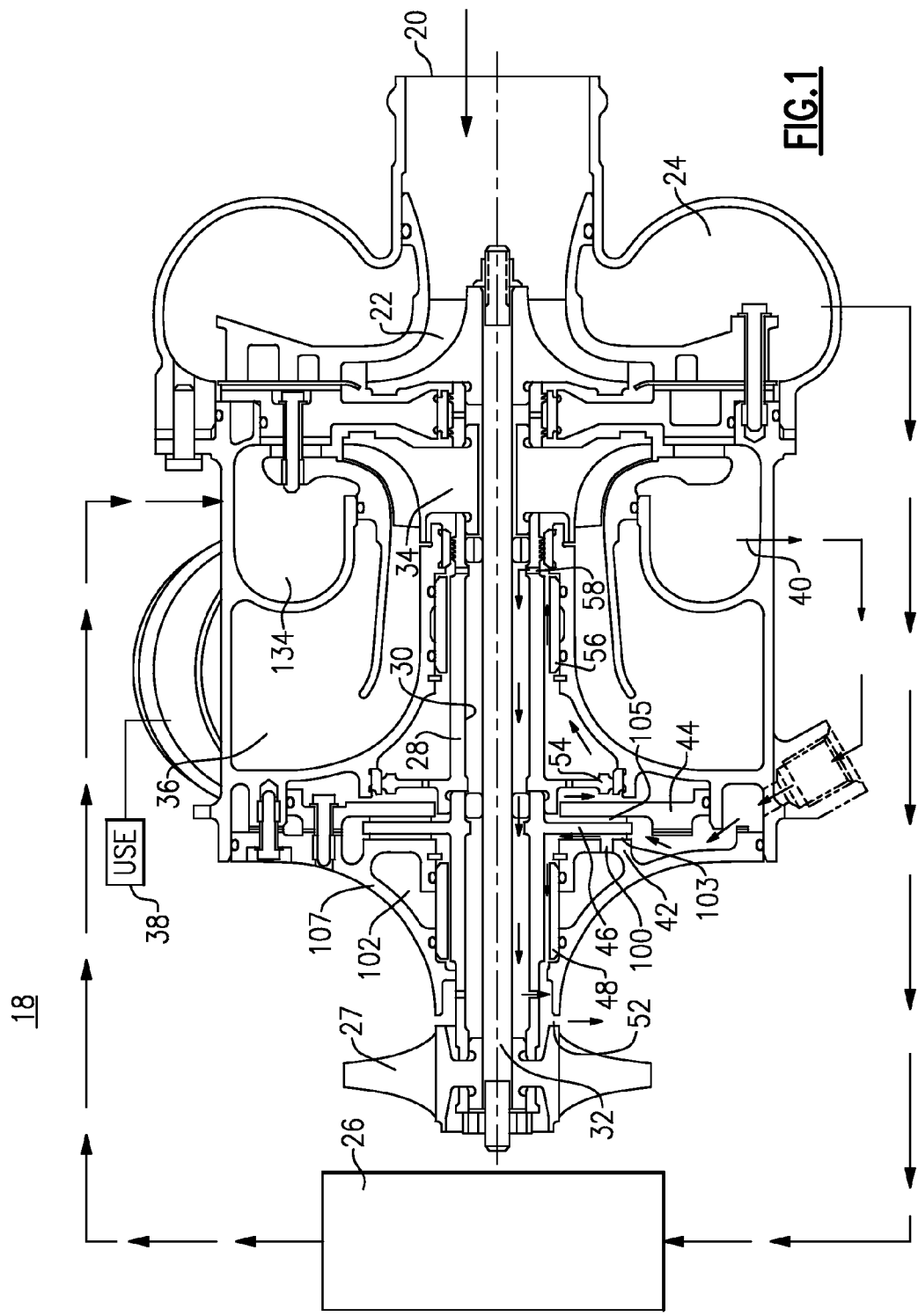
FIG. 1 shows an air machine.

An air machine 18 is illustrated in FIG. 1 having an air inlet 20 receiving partially compressed air, such as downstream of the compressor in a gas turbine engine. This air is delivered to another compressor impeller or rotor 22, where it is further compressed and delivered into a discharge plenum 24. From the discharge plenum 24, the air passes through a heat exchanger 26. A fan 27 is driven by a shaft 28, which is a hollow shaft having an interior bore 30. While the shaft is shown in this embodiment as several distinct components, it should be understood that the term "shaft" could extend to all of the components from the left-hand side of this Figure up to a turbine rotor or impeller 34, and then to the compressor rotor 22. An interior bore 30 is formed in the hollow shaft 28. A central tie shaft 32 ties the fan 27 to the turbine impeller 34 and the compressor impeller 22.

Compressed air from the discharge plenum 24 thus passes through the heat exchanger 26, is cooled by the fan 27, and returned to an inlet plenum 134 downstream of the compressor rotor 22, where it then passes over the turbine rotor 34. The air is expanded and the turbine is driven to drive the compressor impeller 22 and the fan 27. This expanded air then passes into a discharge plenum 36, and then to a downstream use 38. One example use of downstream use would be a cabin air supply for an aircraft.

A cooling air supply is tapped at 40 from the inlet plenum 134 and passes into a cooling path, and is split in cooling air paths 103 and 105 to both sides of a thrust bearing cylindrical member 46, which is perpendicular to, and driven to rotate with, the shaft 28. To a side closest to the rotors 22 and 34, the air passes between the member 46 and a housing 44, through a tortuous path 54, and then to cool an interface surface between a journal bearing 56, and the outer periphery of the shaft 28. As shown, the air passes along the surface, through an opening 58 in the shaft 28, and into an interior bore between an outer periphery of the tie shaft 32, and the inner bore 30 of the shaft 28. The air passes along the entire length of the bearing 56, and also bearing 48, before exiting at an exit 52. On the other hand, the air split on the opposed side of the member 46 passes between a housing 42 and the member 46, and then within the interior bore of the bearing 48 and the outer periphery of the shaft 28. Thus, both bearings 48 and 56, and the associated shaft surfaces, are provided with dual cooling air flow paths.

Figure 2:
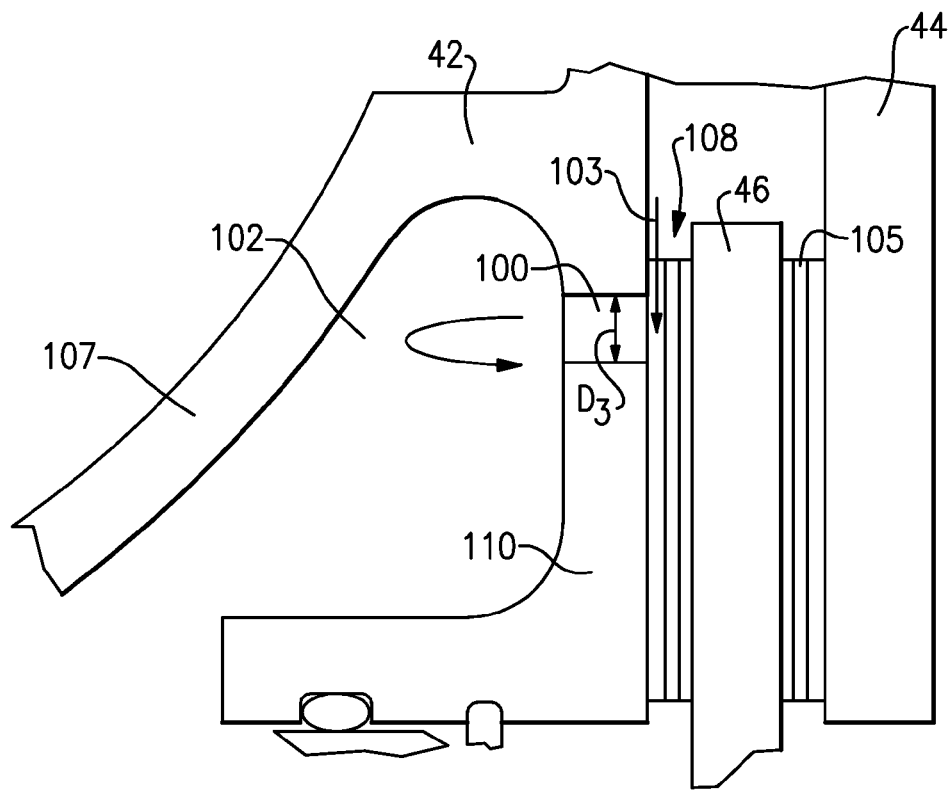
FIG. 2 shows a detail of a thrust bearing surface in the air machine.

As shown in FIGS. 1 and 2, a communication hole 100 communicates cooling air from the cooling air path 103 to a hollow chamber 102 of the housing 42. The hollow chamber 102 is opposite a thrust bearing 108 on member 46. The hollow chamber 102 is an interior cavity of housing 42 that may otherwise act as an insulator trapping heat absent the communication hole 100. Cooling air in the cooling air path 103 reduces heat generated by motion of the thrust bearing 108 and member 46. Connecting air passing through communication hole 100 serves to drive the air within the hollow chamber 102, and transfers heat from a first housing wall 110 toward a second housing wall 107. The second housing wall 107 is on an opposed side of the hollow chamber 102 from the first housing wall 110, where the first housing wall 110 includes the communication hole 100. The flow of cooling air into the hollow chamber 102 further enhances cooling of the thrust bearing 108 and member 46 by reducing the insulating effect of otherwise static air in the hollow chamber 102 and removing heat through the second housing wall 107. In this manner, greater heat is transferred away from a surface of the thrust bearing 108.

Figure 3:
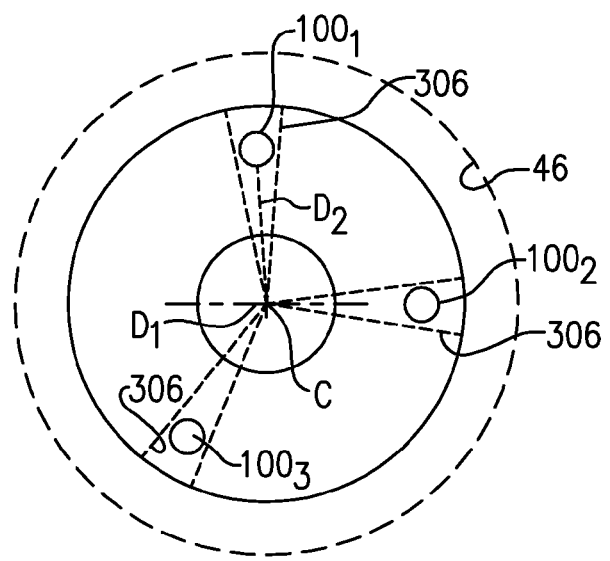
FIG. 3 schematically shows the relative location of the cooling holes in the housing.

While one communication hole 100 is illustrated, there may actually be a plurality of such holes spaced circumferentially about the drive axis of the shaft 28. In fact, as shown in FIG. 3, there may be three cooling holes $100_1$, $100_2$, and $100_3$. As illustrated, there is an angular spacing of the three holes from each other that is unequal. Looking at a center point C, which is also the location of the center of the overall machine and shaft 28, the hole $100_1$ can be taken to be at top dead center. There would then be a 94° spacing to the hole $100_2$. There is then a 120° spacing between hole $100_2$ and hole $100_3$. This leaves a spacing of 146° between hole $100_3$ and hole $100_1$. Of course, other spacings can be used.

As shown, three distances could be assigned to the structure. A first distance $D_1$ is the outer diameter of the member 46. A second distance $D_2$ is the distance between the center point C, and the center of the holes $100_1$, $100_2$, $100_3$. Finally, $D_3$ is the diameter of the holes $100_1$, $100_2$, and $100_3$. In actual embodiments, the $D_3$ measurement is 0.113-0.135" (2.87-3.42 mm). The $D_2$ ranges between 1.2 and 1.5" (30.48-38.1 mm). These diameters are for a system having a $D_1$ of 2.6" (66.04 mm).

Stated another way, a ratio of $D_2$ to $D_1$ ranges between 0.45 and 0.58. A ratio of $D_3$ to $D_1$ ranges between 0.044 and 0.052. Further, a ratio of $D_2$ to $D_1$ would be between 0.075 and 0.113.

Figure 4:
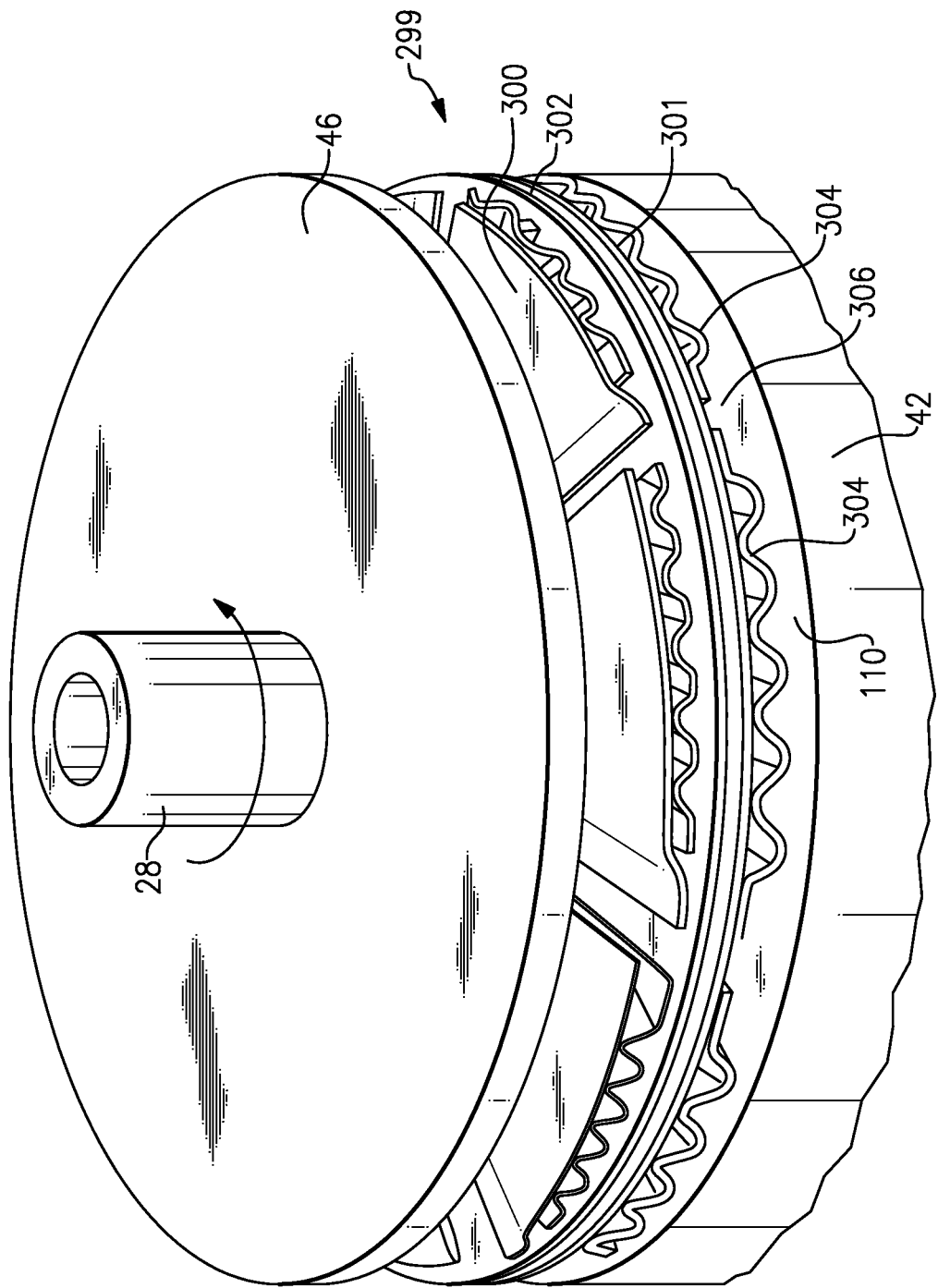
FIG. 4 shows a detail of a thrust bearing which could be incorporated into the air machine of FIG. 1.

FIG. 4 shows the member 46 spaced further away from the housing 42 and wall 110 than it would be in practice, so as to show the detail of the intermediate thrust bearing 299. While the housing 42 is shown to be cylindrical in FIGS. 3 and 4, its actual shape is more as shown in FIGS. 1 and 2. The thrust bearing 299 includes a top foil 300, corrugated foil 301, intermediate plate 302, and backing springs 304. As can be appreciated, the backing springs 304 are formed of a plurality of sections each extending for less than the full 360° of circumference about the axis of the shaft 28. In one embodiment, there are seven such sections. Channels 306 are defined between ends of the backing spring sections 304. Each of the holes $100_1$, $100_2$, and $100_3$ are aligned with one of the channels 306, as is shown schematically in FIG. 3.

A bearing cooling method is disclosed in co-pending U.S. patent application Ser. No. 12/728,306, entitled Journal Bearing With Dual Pass Cooling for Air Machine, filed on even date herewith.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A housing for use in an air machine comprising:
   a first housing wall having an outer face that is to face a member that will rotate with an air machine shaft once the member is mounted within the housing, and to define a thrust bearing surface;
   said first housing wall having a communication hole for communicating cooling air from said outer face into a hollow chamber defined between said first housing wall and a second wall on an opposed side of said hollow chamber from said first housing wall;
   there is a plurality of said communication holes, a center line of said housing, and said communication holes are circumferentially spaced by unequal angles about said center line; and
   a ratio of a diameter of the communication holes to a distance from the center line to a center of said communication holes is between 0.075 and 0.113.

2. The housing as set forth in claim 1, wherein said communication holes are spaced by said unequal angles such that said communication holes will be aligned with channels in a member associated with the thrust bearing surface, once the air machine is assembled.

3. The housing as set forth in claim 1, wherein there are three of said communication holes, with a first and a second of said communication holes spaced by a 94° angle, the second and a third of said communication holes spaced by a 120° angle, and the spacing between the third and first of said communication holes being a 146° angle.

4. The housing as set forth in claim 2, wherein a hole diameter of said communication holes is selected such that a ratio of said hole diameter, and an outer diameter of the member is between 0.044 and 0.052.

5. The housing as set forth in claim 4, wherein a ratio defined between a distance from said center line to a center of said communication holes, and an outer diameter of the member is 0.45-0.58.

6. A housing for use in an air machine comprising:
   a first housing wall having an outer face that is to face a member that will rotate with an air machine shaft rotate once the member is mounted within the housing, to define a thrust bearing surface; and
   said first housing wall having a plurality of communication holes for communicating cooling air from said outer face into a hollow chamber defined between said first housing wall and a second wall on an opposed side of said hollow chamber from said first housing wall;
   there being an axial center line of said housing, and said holes are circumferentially spaced by unequal angles about said center line;
   there being three of said communication holes, with a first and a second of said communication holes spaced by a 94° angle, the second and a third of said communication holes spaced by a 120° angle, and the spacing between the third and first of said communication holes being a 146° angle; and
   a ratio of a diameter of said communication holes to a distance from the center line to a center of said communication holes being between 0.075 and 0.113.

* * * * *